United States Patent [19]

Wang et al.

[11] 4,235,060
[45] Nov. 25, 1980

[54] INSTALLING FIBER INSULATION

[76] Inventors: Robert A. Frosch, Administrator of the National Aeronautics and Space Administration, with respect to an invention of David S. Wang, Orange; Aubrey D. Warren, Lakewood, both of Calif.

[21] Appl. No.: 969,756
[22] Filed: Dec. 15, 1978
[51] Int. Cl.² ............................................. B28B 1/52
[52] U.S. Cl. .................................. 52/743; 156/294; 52/232; 150/11
[58] Field of Search ............... 156/293, 294; 52/743, 52/232, 573, 659, 745; 150/11; 264/126

[56] References Cited
U.S. PATENT DOCUMENTS

| | | | |
|---|---|---|---|
| 1,125,303 | 1/1915 | Gammeter | 156/294 |
| 1,252,415 | 1/1918 | Duckham | 52/232 |
| 2,304,233 | 12/1942 | Bergin et al. | 264/126 |
| 2,549,513 | 4/1951 | Nicolle | 156/294 |
| 2,649,923 | 8/1953 | Woppman | 150/11 |
| 3,368,670 | 2/1968 | Weaver | 52/232 |
| 3,546,846 | 12/1970 | Sens | 53/432 |
| 3,922,425 | 11/1975 | Plumberg | 428/339 |
| 4,133,928 | 1/1979 | Riley et al. | 52/659 |

Primary Examiner—James L. Ridgill, Jr.
Attorney, Agent, or Firm—Marvin F. Matthews; John R. Manning

[57] ABSTRACT

A method for installing fragile, high temperature insulation batting in an elongated cavity or in a resilient wire sleeve to form a resilient seal. The batting is preformed to rough dimensions and wrapped in a plastic film, the film being of a material which is fugitive at a high temperature. The film is heat sealed and trimmed to form a snugly fit skin which overlaps at least at one end to permit attachment of a pull cord. The film absorbs the tensile force of pulling the film enclosed batting through the cavity or wire mesh sleeve and is subsequently driven off by high temperature baking, leaving only the insulation in the cavity or wire mesh sleeve.

2 Claims, 3 Drawing Figures

INSTALLING FIBER INSULATION

BACKGROUND OF THE INVENTION

1. Field of the Invention

The invention relates to installation of insulation, particularly to installation of high temperature, fragile fibrous insulation in restricted space.

2. Description of the Prior Art

There is no known prior art dealing with the specific problem, which arose in connection with the development of heat resistant seals for aerospace vehicles subject to surface heating. Such heating can produce very high temperatures, well beyond the temperatures at which ordinary seal materials are destroyed or very adversely affected. Accordingly, ceramic fiber insulation materials available as batting are used. These materials are relatively fragile, however, and consequently cannot be installed in, or pulled into, restricted spaces without mechanically damaging them and destroying the uniformity of their insulation qualities.

Application of insulation for one purpose or another is, of course, known in the prior art. U.S. Pat. No. 3,922,425 discloses a material useful in roofing, in which a thermal insulation composition is enclosed in a plastic film which is dissolved by hot asphalt applied during a roofing operation. No disclosure concerning emplacement of insulation in restricted spaces is included, however.

U.S. Pat. No. 2,304,233 discloses a method of insulating double-wall panels (i.e., refrigerator doors, etc.) to prevent "slump" or displacement during use. Again the problem of insulation placement in restricted spaces is not addressed.

Another U.S. Pat. No. 3,546,846 deals with the packaging of insulation material. This method may be considered to be relevant to the plastic film enclosing step of the present invention, but does not address the restricted space installation problem, nor does it disclose the concept of using a fugitive packaging material for handling and installation purposes and later evolving that material by baking.

It has been recognized that an effective high heat seal for doors, exterior panels and the like on aerospace vehicles can be produced as an elongated assembly comprising a spring wire mesh sleeve with a high temperature fibrous insulation therein. Such insulation materials are mineral fiber or ceramic types, having very low mechanical strength preventing their being pulled or drawn, especially through elongated restricted spaces.

The manner in which the method of the invention deals with this problem will be understood as this description proceeds.

SUMMARY OF THE INVENTION

In view of the special problems and applications aforementioned, it may be said to have been the general objective of the invention to provide a method for effective installation of insulation in restricted spaces, the method substantially protecting the insulation itself from substantial mechanical forces during installation, while also insuring uniform and effective placement of the insulation.

In accordance with the method of the invention, roughly dimensioned batts of the fragile, high temperature insulation material are wrapped in a plastic film to form a "sausage casing" therefor. Circumferential closure is effected by heat sealing longitudinally as close as reasonably possible to the batting to provide a snug fit of the plastic skin thus formed over the batting. Drawing through a resilient wire mesh sleeve (spring) is then readily accomplished through use of a draw cord attached to an overlapping end portion of the plastic film skin. The plastic skin absorbs the tensile forces produced in the drawing. Subsequent heating (baking) to destructively evolve (drive off) the plastic film leaves the unaffected insulation fibers in the spring sleeve. The resulting assembly is cross-sectionally deformable and therefore useful as a door or hatch seal (or the like). The method will be seen to be also applicable to the drawing of insulation into other restricted spaces, especially if they are of relatively uniform cross-section.

DESCRIPTION OF THE PREFERRED EMBODIMENTS

Figure 1:
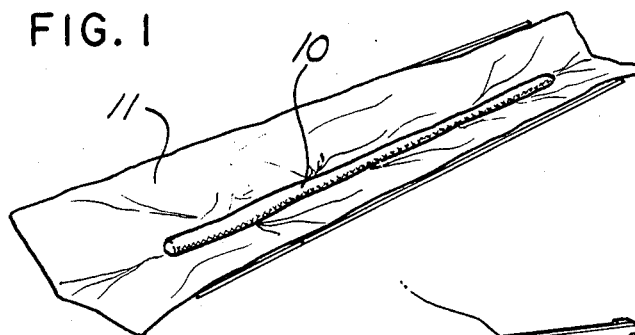
FIG. 1 is a drawing showing a length of high temperature mineral fiber insulation on a thin plastic film in preparation for packaging the fiber in the film.

Referring now to FIG. 1, a roughly-shaped, elongated batt 10, of the high temperature mineral fiber insulation employed is placed over a polyethylene film 11 in a trough-shaped fixture to facilitate manual wrapping of the batt in the film. As previously indicated, the mineral fiber insulation material is relatively fragile and cannot be pulled through the wire mesh (spring) sleeve 13 (FIG. 3) in an unprotected form without damage.

Figure 2:
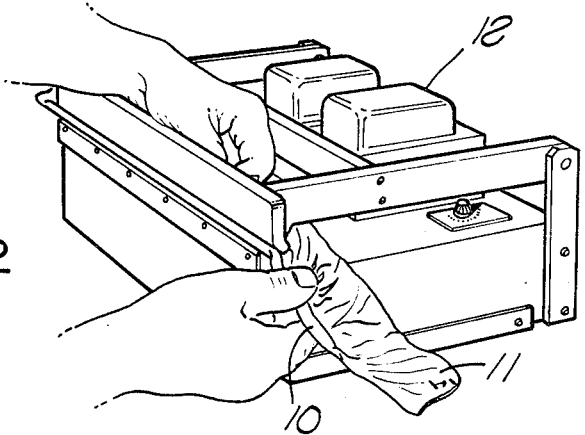
FIG. 2 shows the heat sealing operation to enclose the fiber insulation in a skin of the plastic film.

From the step illustrated in FIG. 1, the film may be folded over on itself and heat sealed to form a circumferentially continuous enclosure. The heat sealing step is illustrated in FIG. 2. The type of heat sealing device 12 used is not unlike that used for plastic film packaging of various consumer products. Elongated heat applicators are adapted for effecting the heat fusion of the thermoplastic film 11 sufficiently close to the fiber insulating material so that the film or skin fits snugly over the fiber insulation batt within.

Figure 3:
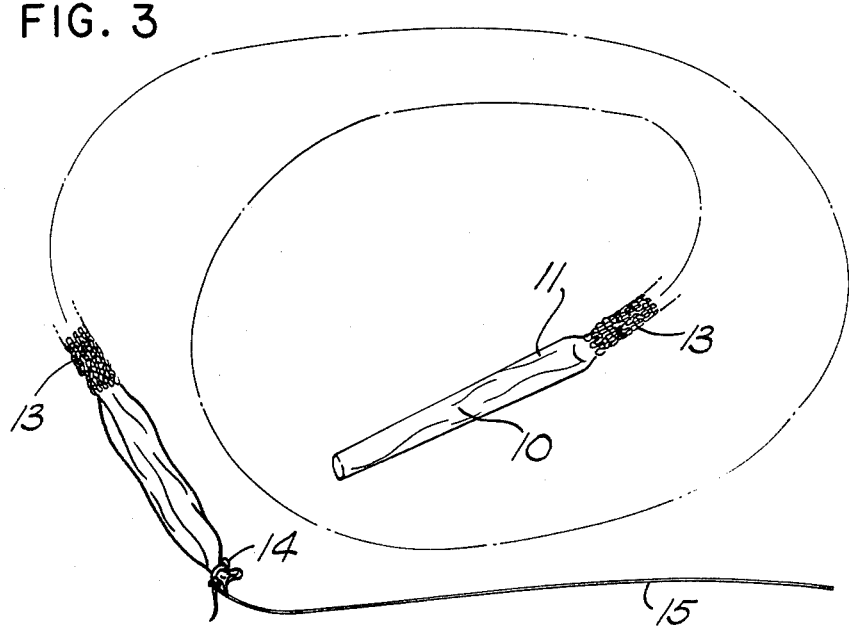
FIG. 3 illustrates the seal assembly resulting from pulling the plastic film encased fiber into a wire "spring" sleeve.

After the heat fusion operation depicted in FIG. 2, the remaining flanges of the plastic film may be trimmed away so that the fiber insulation material appears to be encased in a relatively uniform tubular skin. One end of this assembly preferably has some longitudinally overlapping plastic film which serves as an attachment for some pulling means. FIG. 3 depicts the film-encased high temperature fiber material after it has been drawn through a length of wire mesh sleeving 13. The plastic film is tied to a pull cord 15 at 14, the cord 15 having been previously extended through the full length of the wire mesh sleeve. In pulling the film encased fiber batt through the wire mesh (spring) sleeve 13, the end 14 enters first. In FIG. 3, it is assumed that some excess of the film encased fiber material is extant at both ends of the wire mesh sleeve, however such excess is readily trimmed away.

The wire mesh (spring) sleeve is preferably of material such as Inconel 750 or the like in view of its spring characteristics and heat resistance.

The final process step involves baking the FIG. 3 assembly at an elevated temperature, for example 800°

F. for the polyethylene film suggested. At that temperature the film "clean burns" completely and the fiber insulation is unaffected, except that it is released for at least some radial expansion within the wire mesh sleeve. The film material is substantially eliminated from the finished assembly, which can then be incorporated as a high temperature seal.

Typical light-weight, high temperature ceramic (mineral) fiber materials for the batting 10 include various known materials such as saffil high temperature alumina. Alumina/zirconia fiber batting is also a possible insulation for the type of application.

The seal assembly of FIG. 3, produced in accordance with the process has various high temperature sealing applications. In certain aerospace vehicles where high aircraft surface temperatures are experienced, doors and hatches must be sealed against this heat, in addition to whatever sealing is required against air pressure differentials.

The seal produced according to the invention is radially flexible and resiliently deformable in cross-section. Accordingly it is readily applied as a heat seal as an interface between a door, hatch or external access panel and the fixed structures of the craft.

In one form, the finished (baked out) assembly of FIG. 3 may be covered by one or more sleeves of woven or braided ceramic fibers. In one application, a first ceramic fiber sleeve fits snugly over the wire mesh 13, and a second, less coarsely braided ceramic fiber cloth is wrapped around the first ceramic fiber sleeve leaving a tangential overlap which extends over the length of the seal assembly. This tangential flange may then be molded onto a base plate of machinable glass-ceramic using a room temperature vulcanized, high temperature silicone rubber material. Finally, the base plate may be attached using a high temperature resistant adhesive.

The method of the invention will be recognized as applicable to the manufacture of seals for process furnaces, autoclaves, kilns and the like. The method of the invention will also be recognized as applicable to the installation of the fragile high temperature ceramic insulation material in cavities other than in the wire mesh described, provided those cavities are of relatively uniform cross-section.

What is claimed is:

1. The method of making an elongated heat seal in which the heat-resistant material is a relatively fragile ceramic fiber, comprising:

forming said ceramic fiber into an elongated batt;

wrapping said batt in a film of thermo-plastic material which is fugitive at an elevated temperature, and heat sealing said film to produce a substantial circumferential closure of said film into a generally tubular snug skin around said batt;

attaching a draw cord to one end of said tubular skin and drawing said film enclosed batt through the interior cavity of an elongate tubular resilient wire mesh sleeve to form an assembly, said skin thereby relieving said batt of the tensile forces attendant to said drawing step;

and baking said assembly at said elevated temperature to drive off said film completely leaving substantially only said ceramic fiber bat in place in said cavity and effecting an even expansion of said fragile batt throughout its length.

2. The method according to claim 1 in which said elevated temperature is defined as high enough to drive off said film cleanly in a predetermined time, without substantially affecting the structural integrity of said batt.

* * * * *